Patented Sept. 13, 1932

1,877,146

UNITED STATES PATENT OFFICE

KARL SCHIRMACHER, WILHELM SCHAICH, ARTHUR WOLFRAM, HANS TAMPKE, KURT BILLIG, AND WERNER SCHIRMACHER, OF HOCHST-ON-THE-MAIN, GERMANY, ASSIGNORS TO GENERAL ANILINE WORKS, INC., OF NEW YORK, N. Y., A CORPORATION OF DELAWARE

PROCESS FOR PREPARING DYESTUFFS OF THE N.N-DIHYDRO-1.2.2'.1'-ANTHRAQUINONE AZINE SERIES AND PRODUCTS OBTAINABLE THEREBY

No Drawing. Application filed May 26, 1927, Serial No. 194,523, and in Germany June 15, 1926.

The present invention relates to a new process for preparing dyestuffs of the N.N-dihydro-1.2.2'.1'-anthraquinone azine series and to new products obtainable thereby.

We have found that dyestuffs of the N.N-dihydro-1.2.2'.1'-anthraquinone azine series are obtainable by a process which comprises as first step: treating with an oxidizing agent in an acid or alkaline solution in the cold or at an elevated temperature an anthrahydroquinone of the following formula:

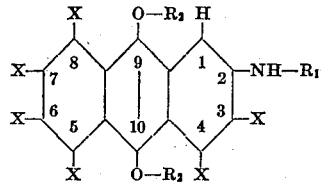

wherein $R_1$ stands for hydrogen or alkyl, $R_2$ stands for the residue of a compound capable of reacting with the hydrogen atoms of the OH groups situated in 9.10-position of an anthrahydroquinone such as for instance halogensulfonic acids, halogen alkyls, halogen fatty acids, sulfuric acid esters or the like and X stands for hydrogen or any substituent, or 2 adjacent X's jointly represent the grouping:

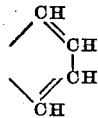

such as, for instance, 2-amino-anthrahydroquinone-9.10-diester sulfonic acids, 2-monomethylamino-anthrahydroquinone - 9.10 - diethers, 2-aminoanthrahydroquinone-9.10-diethercarboxylic acids or similar compounds, which contain in the anthrahydroquinone nucleus at least one amino- or alkylamino-group in β—position, and in which at least one α—position, being in ortho position to an amino group, is substituted by hydrogen; and as second step: splitting off by a saponifying agent the residues situated at the oxygen atoms in 9.10-position and finally treating with an oxidizing agent the leuco compound of the dyestuff thus obtained.

In many cases the second step will be unnecessary, saponification having already taken place during the former oxidizing process in an acid or alkaline solution. If for instance the above mentioned 2-aminoanthrahydroquinone-9.10-diestersulfonic acids are subjected to oxidation in an acid solution, the just mentioned saponifying process will be superfluous, since saponification takes place during the oxidation in an acid solution. In this case it is advantageous to carry out the process in such a manner that the splitting off of the sulfo residues takes place after the oxidation, that is to say, that the quantity of the acid used in the reaction is kept so low during the oxidation process that there is still a distinct acid reaction towards Congo paper. For this purpose the acid set free during the process is nearly neutralized according to the extent of its formation by the addition of a suitable agent or by diminishing the dissociation degree of the acid by the addition of a salt.

By proceeding in the above described manner, dyestuffs of the N.N-dihydro-1.2.2'.1'-anthraquinone azine series are obtainable which by the addition of alkaline hydrosulfite yield vats dyeing vegetable fibres fast tints generally of a blue shade. The new dyestuffs in question may doubtless be classed under the type of the well known N-N-dihydro-1.2.2'-1'-anthraquinone azine.

The above mentioned 9.10-derivatives of the 2-aminoanthrahydroquinone are produced by causing for instance $SO_3$ or a halogensulfonic acid or an ester thereof, such as chlorosulfonic acid or a chlorosulfonic acid ester, or a sulfuric acid ester, such as dimethyl sulfate, or a halogen fatty acid or its esters, or any other compound of like reaction, to act upon a 2-acylaminoanthrahydroquinone or its homologues or substitution products, whereby 9.10-diester-sulfonic acids, 9.10-diethers, 9.10-diethercarboxylic acids or other 9.10-derivatives are obtained, and by finally splitting off the N-acyl group.

For instance the salts of the 2-aminoanthrahydroquinone - 9.10 - diestersulfonic acids can be prepared by subjecting a 2-acylaminoanthrahydroquinone, or its analogues or homologues or substitution products in presence of a tertiary base to reaction with SO₃ or an agent capable of splitting off SO₃, such as halogensulfonic acid or an ester thereof, and eliminating the acyl groups from the 2-acylamino-anthrahydroquinone-9.10-diestersulfonic acids thus obtained by heating them with aqueous alkalis.

In the above described new process it is of advantage to use ferric salts as oxidizing agent.

The dyestuffs obtained by the new process may either be purified by treating with an organic solvent, such as for instance pyridine or they may be freed from any small quantities of by-products by re-vatting.

The following examples serve to illustrate our invention, but are not intended to limit it thereto, the parts being by weight:

(1) An aqueous solution of 42,9 parts of the disodium salt of the 2-aminoanthrahydroquinone-9.10-diestersulfonic acid is acidified with hydrochloric acid, if necessary filtered, and there is then added at ordinary temperature, while stirring, a solution of ferric chloride until the latter remains permanently in excess. The mass is stirred for several hours, the dark blue precipitate is filtered off, the filtrate is washed first with acidulated water and then with pure water and the resulting dyestuff is purified, if necessary by re-vatting. The dyestuff represents N-N'-dihydro-anthraquinone-azine of the most probable formula:

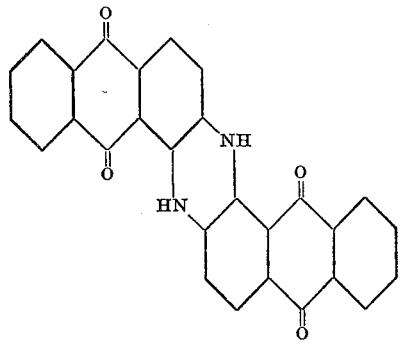

(2) Into a mixture composed of a solution of 110 parts of commercial ferric chloride in 400 parts of water and 60 parts of caustic soda solution of 40° Bé, is run at 75–80° C. an aqueous solution of 42,9 parts of the disodium salt of the 2-amino-anthrahydroquinone-9.10-diestersulfonic acid in 500 parts of water and into this mixture is slowly introduced hydrochloric acid until the mass shows an acid reaction toward Congo paper. After the mass has been stirred for half an hour, the dark blue precipitate is filtered by suction, and well washed, whereupon the resulting dyestuff is purified, if necessary, by re-vatting it. The dyestuff dyes cotton pure blue tints of excellent fastness to light. The dyestuff obtainable according to this example is identical with the dyestuff obtainable according to Example 1.

(3) Into a mixture of 50 parts of ferric sulfate, 200 parts of ammonium sulfate and 200 parts of water is run at 90° C., while stirring, a solution of 23 parts of the dipotassium salt of 2-aminoanthrahydroquinone-9.10-diestersulfonic acid and 50 parts of ammonium sulfate in 250 parts of water and the mass is kept at the said temperature for half an hour. The dark-blue precipitate is filtered off and is further treated as indicated (in Example 1). The resulting dyestuff is identical with that defined (in Example 1).

(4) Into 500 parts of a solution of sodium sulfate of 15% strength, heated to 80–85° C., are simultaneously and uniformly run, while stirring, firstly a solution of 1000 parts of ferric sulfate and 500 parts of sodium sulfate in 3500 parts of water, and secondly a solution of 429 parts of the disodium salt of 2-aminoanthrahydroquinone - 9.10 - diestersulfonic acid and 80 parts of caustic soda in 5000 parts of water. After having brought together the two solutions, the whole is stirred for a short time at 85–90° C. and the resulting blue dyestuff is further treated as indicated (in Example 1). The yield amounts to almost the theoretically possible quantity. The dyestuff obtainable according to this example is identical with the dyestuff obtainable according to Example 1.

(5) A solution of 46,4 parts of the disodium salt of the 2-amino-3-chloroanthrahydroquinone-9.10-diestersulfonic acid in 400 parts of water is slightly acidified in the cold with hydrochloric acid and this solution is run at ordinary temperature into a solution of 120 parts of commercial ferric chloride in 600 parts of water and 50 parts of hydrochloric acid of 10% strength. After 24 hours, the brownish-green oxidation product is filtered by suction, washed and dried. In order to purify the product it is extracted with boiling nitrobenzene, it is then filtered, while hot, and washed with warm pyridine. The residual product is N-N'-dihydro-3.3'-dichlor-1.2.2'.1'-anthraquinone-azine of the most probable formula:

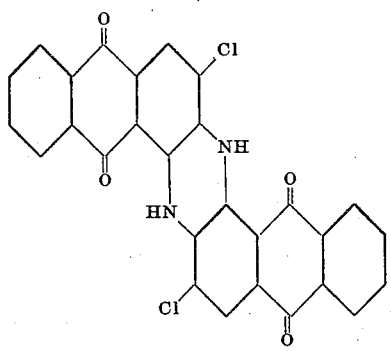

forming a brilliant violet-blue powder, which may, if required, be purified further by revatting. This powder gives on addition of an alkaline solution of hydrosulfite a blue, clear vat dyeing cotton a blue tint.

(6) An aqueous solution of 44,3 parts of the disodium salt of 2-amino-3-methyl-anthrahydroquinone-9.10-diestersulfonic acid is slightly acidified with hydrochloric acid and run at ordinary temperature into a solution of 120 parts of ferric chloride in 600 parts of water and 50 parts of hydrochloric acid (10%). After 24 hours, the greenish-blue oxidation product is filtered by suction, washed and dried. In order to purify it, it may be extracted with boiling nitrobenzene; the product is then again filtered, while hot, and washed with pyridine. The remaining N-N'-dihydro-3.3'-dimethyl-1.2.2'.1'-anthraquinone-azine may be purified further by re-vatting. By adding thereto alkaline hydrosulfite a blue vat is obtained which dyes cotton a blue tint.

The dyestuff has the following formula:

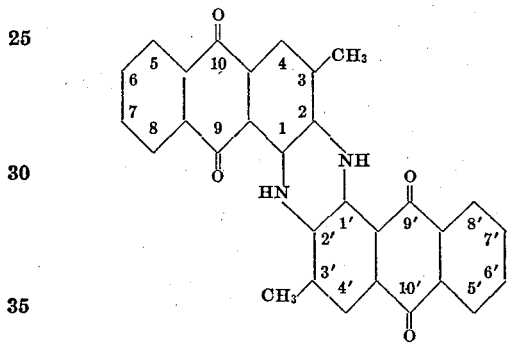

(7) 46,4 parts of a mixture of the disodium salt of 2-amino-6(or 7)-methylanthrahydroquinone-9.10-diestersulfonic acid (obtained by condensation of 4-nitrophthalic anhydride with toluene, subsequent reduction, closure of the ring, acetylation followed by reduction of the acetylamino-compound produced to the corresponding leuco-compound, reaction of the latter with halogen-sulfonic acid in presence of a tertiary base and elimination of the acetyl group) are dissolved in 500 parts of water and gradually added at a temperature of 95° C. to a solution of 100 parts of ferric sulfate and 50 parts of crystallized sodium sulfate in 300 parts of water. After 1-2 hours the whole is filtered by suction and the solid matter washed with hot water and dried, whereupon the bluish-green product is extracted with boiling nitrobenzene, filtered by suction and washed with hot pyridine. The residual product is N-N'-dihydro-6.6' (or 7.7')-dimethyl-1.2.2'.1'-anthraquinone-azine and forms a powder of a brilliant violet-blue color which may be purified further by revatting it. This dyestuff gives a blue clear vat which dyes a reddish-blue shade.

The dyestuff has the formula:

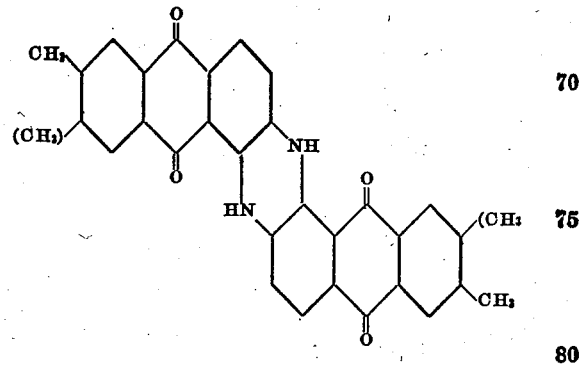

In an analogous manner may be produced the N-N'-dihydro-6.6' (or 7.7')-dichloro-1.2.2'.1'-anthraquinone-azine and the N-N'-di-hydro-6.7.6'.7'-tetrachloro-1.2.2'.1'-anthraquinone-azine.

(8) 46,6 parts of the disodium salt of 2-methyl-amino-anthraquinone-9.10-diestersulfonic acid are dissolved in 500 parts of water; this solution is made slightly alkaline by adding caustic soda solution and run slowly into a solution of 100 parts of ferric sulfate in 300 parts of water which is heated to 95° C. during the process. After one hour the mixture is filtered by suction, washed with hot water and the dark-brown residue is repeatedly extracted with boiling alcohol. The residual product is N-N'-dimethyl-1.2.2'.1'-anthraquinone-azine and forms a blue powder. This dyestuff dyes cotton blue tints in a slightly alkaline cold vat.

The dyestuff has the formula:

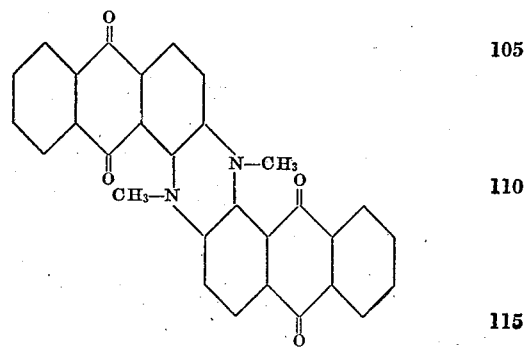

(9) 46,4 parts of the disodium salt of 2-amino-6(7)chloroanthrahydroquinone-9.10 10-diestersulfonic acid are dissolved in water and slowly run into a solution (temperature 95° C.) of 100 parts of ferric sulfate and 50 parts of crystallized sodium sulfate in 300 parts of water. After 1-2 hours the mixture is filtered by suction, washed with hot water and dried. The resulting dark greenish-blue product is treated with a boiling solvent, for instance nitrobenzene, filtered off by suction and washed with hot pyridine. The N-N'dihydro-6.6'-(7.7')-dichlor- 1.2.2'.1'-anthraquinone-azine is left as a dark blue powder and can be purified further by revatting. It dyes from a clear blue vat cotton a blue tint.

The dyestuff has the formula:

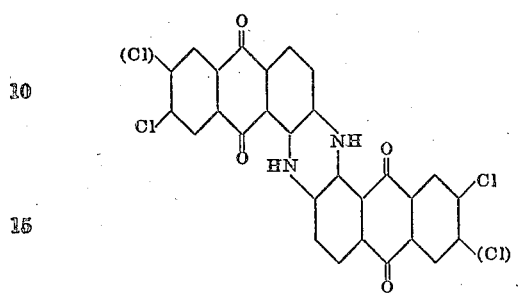

(10) 49,9 parts of the disodium salt of the 2 - amino-6.7 - dichloroanthrahydroquinone - 9.10-diestersulfonic acid are dissolved in water and slowly run into a solution (temperature 95° C.) of 100 parts of ferric sulfate and 50 parts of crystallized sodium salt in 300 parts of water. After 1–2 hours, the mixture is filtered, washed with hot water, the dark greenish-blue product is extracted with for instance boiling nitrobenzene, again filtered and washed with hot pyridine. The residual product is N-N'-dihydro-6.7.6'.7'-tetrachloro-1.2.2'.1'-anthraquinone-azine forming a deep blue powder which may be purified further by re-vatting. It dyes from a blue vat cotton a blue tint. It has the formula:

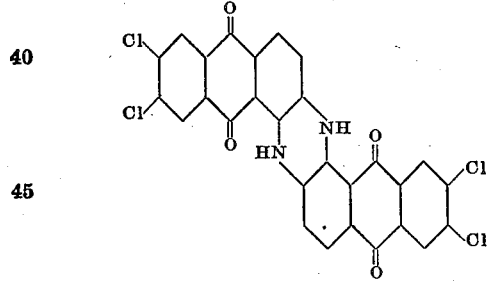

(11) 47,8 parts of the disodium salt of 2-amino - 6.7 - chloro - methylanthrahydroquinone-9.10-diestersulfonic acid are dissolved in water and slowly run into a solution (temperature 95° C.) of 100 parts of ferric sulfate and 50 parts of crystallized sodium sulfate in 300 parts of water. After 1–2 hours the mixture is filtered by suction, washed with hot water; the resulting dark greenish-blue product is extracted with for instance boiling nitrobenzene filtered and washed with hot pyridine. The residual product is N-N'-dihydro - 6.7.6'.7'- dichlorodimethyl - 1-2.2'.1'-anthraquinone-azine forming a deep blue powder which may be purified further by revatting. It yields a blue vat which dyes cotton a blue tint. The dyestuff has the following formula:

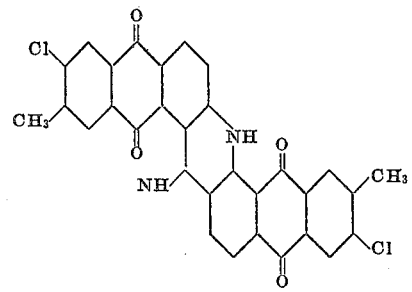

(12) 45,7 parts of the disodium salt of the 2-amino-6.7-dimethyl-anthrahydroquinone-9.10-diestersulfonic acid are dissolved in water and slowly run into a solution (temperature 95° C.) of 100 parts of ferric sulfate and 50 parts of crystallized sodium sulfate in 300 parts of water. After 1–2 hours, the mixture is filtered, washed with hot water and the resulting dark greenish-blue product is extracted with for instance boiling nitrobenzene, filtered and washed with hot pyridine. The residual product is N-N'-dihydro-6.7.6'-7'-tetramethyl-1.2.2'.1'-anthraquinone-azine which forms a dark blue powder and can be purified further by re-vatting. The dyestuff yields a blue vat dyeing cotton a blue tint. It has the formula:

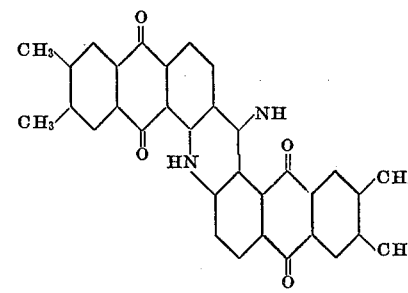

(13) 47,8 parts of the disodium salt of the 2 - amino - 6.8 - chloromethyl - anthrahydroquinone-9.10-diestersulfonic acid are dissolved in water and run slowly into a solution (temperature 95° C.) of 100 parts of ferric sulfate and 50 parts of crystallized sodium sulfate in 300 parts of water. After 1–2 hours, the mixture is filtered by suction, washed with hot water, the resulting dark greenish-blue product is extracted with for instance boiling nitrobenzene, filtered and washed with hot pyridine. The residual product is N-N'-dihydro-6.6'-8.8'-dichlorodimethyl-1.2.2'.1'-anthraquinone-azine and forms a deep blue powder, which may be purified further by re-vatting. This dyestuff gives a clear blue vat which dyes a blue shade. The dyestuff has the formula:

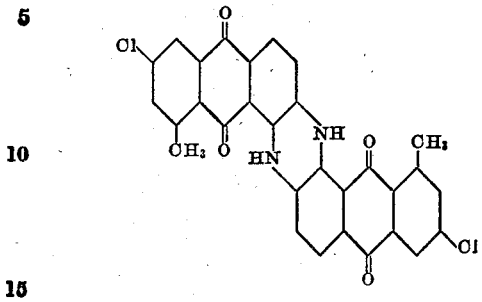

(14) An aqueous solution of 47,3 parts of the disodium salt of 2-amino-3-carboxy-anthrahydroquinone-9.10-diestersulfonic acid is slightly acidified with a small quantity of hydrochloric acid and added at ordinary temperature to a solution of 120 parts of ferric chloride in 600 parts of water and 50 parts of diluted hydrochloric acid. After 48 hours, the resulting dark greenish-blue oxidation product is filtered by suction, washed and dried. In order to purify the product, it is extracted with boiling pyridine. The residual product is N-N'-dihydro-1.2.2'.1'-anthraquinone-azine-3.3'-dicarboxylic acid which may be purified further by re-vatting. This dyestuff gives a greenish-blue vat which dyes cotton azure-colored tints. It has the formula:

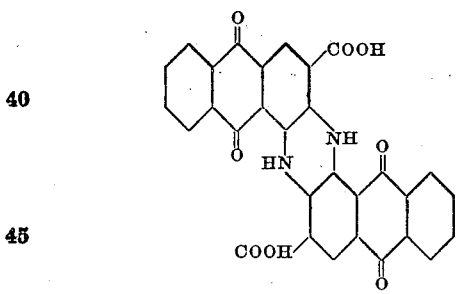

(15) 47,9 parts of the disodium salt of 2-amino-5.6-benzanthrahydroquinone-9.10-diestersulfonic acid are dissolved in water and run slowly into a solution of 100 parts of ferric sulfate and 50 parts of crystallized sodium sulfate in 300 parts of water which is heated to 90° C. After one hour, the mixture is filtered by suction, washed with hot water and the resulting green product is extracted for instance with boiling pyridine. The mass is then filtered by suction and washed with boiling pyridine. The residual product is N-N'-dihydro-5.6.5'.6'-dibenz-1.2.2'.1'-anthraquinone-azine and forms a green powder which may be purified further by re-vatting. This dyestuff dyes cotton from a blue vat green tints. It has the formula:

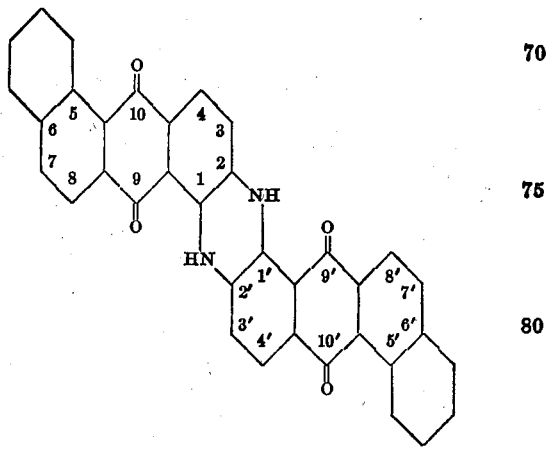

(16) An aqueous solution of 42,9 parts of the disodium salt of β-aminoanthrahydroquinone-9.10-diestersulfonic acid is mixed with 4 parts of caustic soda solution 40° Bé. and into this mixture is introduced by portions, while stirring, at 10–15° C. an aqueous solution of 16 parts of potassium permanganate until the latter is no longer consumed. After the pyrolusite formed is filtered by suction, the yellow liquor is acidified whereupon the color changes to violet-red. After a short time a violet-red compound separates which is filtered off and washed with cold water. This compound dissolves in hot water and dyes wool from an acid bath a violet-red tint.

The above mentioned violet-red product is dissolved in water and heated for some time to 90–95° C. with 7 parts of sodium nitrite. A compound, which is sparingly soluble, precipitates soon, it is filtered off and washed with water. The compound is then treated with diluted alkali and hydrosulfite and thus yields a blue vat from which cotton is dyed pure blue tints. The dyestuff obtainable according to this example is identical with the dyestuff obtainable according to Example 1.

(17) The same dyestuff as that obtained according to Example 16 is produced by using instead of 16 parts of permanganate, a hypochlorite solution of 2,8 volume per cent, adding the latter under the same conditions until there is an excess of hypochlorite, removing after some hours the excess, for instance by means of sulfite and carrying out the further operations (as indicated in Example 16).

In quite an analogous manner there may be used potassium ferricyanide instead of hypochlorite.

(18) 27 parts of β-acetaminoanthraquinone are suspended in 200 ccm of alcohol and treated in presence of a nickel catalyst with hydrogen under pressure until the absorption of $H_2$ is complete. The alcoholic suspension of the reaction product is dissolved with 28,5 parts of caustic soda solution of 40° Bé. and 200 parts of water and the whole is then well stirred, at ordinary temperature with exclusion of air with 31,5 parts of dimethylsulfate. The precipitated β-acetaminoanthrahydroquinone-9.10-dimethylether forms a yellow product and becomes almost pure immediately on filtering and washing with diluted caustic soda solution and finally with water and, when recrystallized from glacial acetic acid or alcohol, it melts at 253° C. The product dissolves in alcohol with a yellow color and a green fluorescene.

In order to saponify the acetyl compound, 10 parts of 2-acetylaminoanthrohydroquinone-9.10-dimethylether are boiled on the reflux cooler with 300 parts of water, 200 parts of alcohol and 40 parts of hydrochloric acid of 20° Bé. until the whole is dissolved. On cooling, the hydrochloride of the 2-aminoanthrahydroquinone-dimethylether precipitates in the form of scales of a slightly brown color. 10 parts of the hydrochloride thus obtained are finely triturated with 10 parts of crystallized sodium acetate and the mixture is heated to boiling for a short time with 100 parts of water. After cooling, the base is filtered by suction and washed with water. The resulting yellowish-brown crude product may be purified by recrystallization from aqueous alcohol and then forms light-yellow scales of melting point 235° C. It gives in alcohol a yellow solution with a green fluorescence. The 2-aminoanthrahydroquinone-dimethylether dissolves readily in diluted hot hydrochloric acid and precipitates in the cold almost quantitatively in the form of its hydrochloride. On adding nitrite to the hydrochloride solution of the amine a deep-violet diazo solution is formed which, when coupled with β-naphthol assumes a brownish-violet color.

25 parts of the hydrochloride, after being reduced to dust, are suspended in 250 parts of water and 30 parts of hydrochloric acid of 20° Bé., mixed with 30 part of a 10% solution of ferric chloride and the whole is slowly heated to boiling, while stirring. The oxidation product separates as a brown precipitate, it is then filtered and washed with hot water. Recrystallized from xylene, it forms yellow-brown laminæ with a melting point above 290° C. Its solution in alcohol, benzene and xylene shows a yellow color with an intense green fluorescence.

10 parts of the oxidation product thus obtained are dissolved in 100 parts of concentrated sulfuric acid and this solution is heated for a short time to 90–100° C. in order to eliminate the ether residues and to oxidize the leuco compound. On cooling, the solution is poured into water, filtered by suction and the blue precipitate is washed until neutral. The resulting blue dyestuff dyes cotton from the vat fast blue tints.

If required, the dyestuff obtained according to the foregoing example may be purified by re-vatting or extraction with pyridine or the like. The dyestuff obtainable according to this example is identical with the dyestuff obtainable according to Example 1.

(19.) 281 parts of 2-formylamino-anthrahydroquinone-9.10-dimethylether, melting point 202–203° C., (obtainable according to Example 18) or by reducing formylaminoanthraquinone with an alkali and hydrosulfite in the cold and subsequently treating with methylating agent) are finely sub-divided and boiled together on the reflux cooler and while stirring with 6000 parts of water and 600 parts of caustic soda solution of 40° Bé. until saponification is complete. On cooling the mass is filtered and washed until neutral. The bright yellow 2-aminoanthrahydroquinone-9.10-dimethylether, when recrystallized from alcohol, melts at 235–236° C. It dissolves in alcohol, benzene and acetone to a reddish-yellow solution with a yellowish-green fluorescence, whereas the non-saponified product dissolves in the same solvents as above mentioned to a yellow solution with a bluish-green fluorescence.

23,3 parts of the product so obtained are treated in the cold while stirring in presence of 500 parts of benzene with 400 parts of a hypochlorite solution, containing 11 per cent active chlorine until no further diminution of its content of active chlorine can be ascertained. The mass resulting from the reaction is filtered, washed with benzene and the residue is dried. This residue is of a yellowish-red color and dissolves in concentrated sulfuric acid on heating with a pure yellowish-brown color.

The precipitate, after being dried, is converted into the blue dyestuff in the manner indicated in Example 18. This dyestuff is identical with that obtained according to Example 18.

(20) 34,1 parts of 2-amino-anthrahydroquinone-9.10-diacetic acid of the most probable formula:

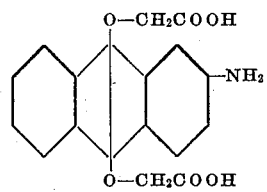

are dissolved in 1000 parts of water and 60 parts of hydrochloric acid (20° Bé.) and the solution, which is heated up to 80° C., is slowly introduced, while stirring, into a solution, heated to the same temperature, of 100 parts of crystallized ferric chloride in 1000 parts of water. The mixture is heated for one hour on the water bath, then cooled, filtered by suction and the product is finally washed until neutral. The reddish-brown intermediate product thus obtained is mixed with 150 parts of sulfuric acid of 80–90% strength and heated for 1–2 hours at a temperature of 80–90°. On pouring the mixture into water, a blue dyestuff precipitates, which may, if required, be purified by re-vatting or extraction with boiling pyridine. The dyestuff obtainable according to this example is identical with the dyestuff obtainable according to Example 1.

We wish it to be understood that one may use in the processes hereafter claimed instead of the disodium salt of the 2-aminoanthrahydroquinone-9.10-diester sulfonic acids any other salt thereof or the corresponding free acids.

We wish it to be understood that the term "a solution of a ferric salt having a weakly acid reaction" is intended to designate solutions of ferric salts to which so much of an alkaline reacting agent, as for instance a solution of caustic soda, has been added that they react weakly acid and no ferric hydroxide is precipitated.

We claim:

1. The process which comprises treating with an oxidizing agent an anthrahydroquinone of the following formula:

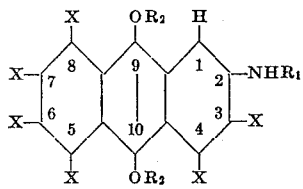

wherein $R_1$ stands for hydrogen or alkyl, $R_2$ stands for alkyl, aralkyl, carboxyalkyl, a sulfonic acid group, or a salt of a carboxyalkyl or sulfonic acid group, and X stands for hydrogen, halogen, alkyl or a carboxy group, or two adjacent X's jointly represent the grouping:

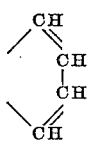

in which case the other X's are hydrogen and splitting off by means of a saponifying agent the residue situated at the oxygen atoms in 9.10-position, and finally oxidizing the leuco compounds thus obtained.

2. The process which comprises treating with a solution of a ferric salt an anthrahydroquinone of the following formula:

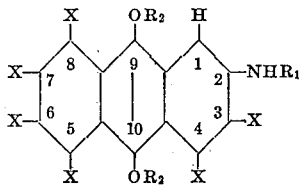

wherein $R_1$ stands for hydrogen or alkyl, $R_2$ stands for alkyl, aralkyl, carboxyalkyl, a sulfonic acid group, or a salt of a carboxyalkyl or sulfonic acid group, and X for hydrogen, halogen, alkyl or a carboxy group, or two adjacent X's jointly represent the grouping:

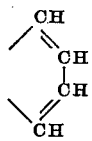

in which case the other X's are hydrogen and splitting off by means of a saponifying agent the residues situated at the oxygen atoms in 9.10-position, and finally oxidizing the leuco compounds thus obtained.

3. The process which comprises treating with a solution of a ferric salt having a weakly acid reaction an anthrahydroquinone of the following formula:

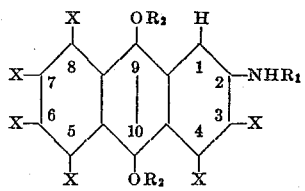

wherein $R_1$ stands for hydrogen or alkyl, $R_2$ stands for alkyl, aralkyl, carboxyalkyl, a sulfonic acid group, or a salt of a carboxyalkyl or sulfonic acid group, and X for hydrogen, halogen, alkyl or a carboxy group, or two adjacent X's jointly represent the grouping:

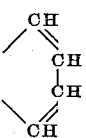

in which case the other X's are hydrogen and splitting off by means of a saponifying agent the residues situated at the oxygen atoms in 9.10-position, and finally oxidizing the leuco compounds thus obtained.

4. The process which comprises treating with a solution of a ferric salt having a weakly acid reaction and in the presence of a neutral salt an anthrahydroquinone of the following formula:

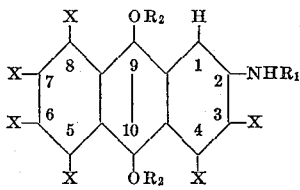

wherein $R_1$ stands for hydrogen or alkyl, $R_2$ stands for alkyl aralkyl, carboxyalkyl, a sulfonic acid group, or a salt of a carboxyalkyl or sulfonic acid group, and X for hydrogen, halogen, alkyl or a carboxy group, or two adjacent X's jointly represent the grouping:

in which case the other X's are hydrogen and splitting off by means of a saponifying agent the residues situated at the oxygen atoms in 9.10-position, and finally oxidizing the leuco compounds thus obtained.

5. The process which comprises treating with an acid oxidizing agent an anthrahydroquinone-9.10-diestersulfonic salt of the formula:

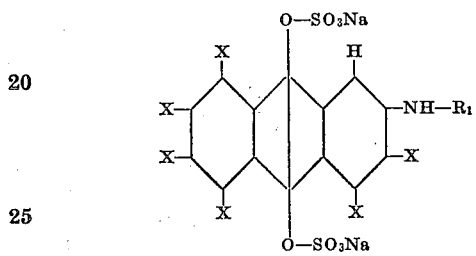

wherein $R_1$ stands for hydrogen or an alkyl group, X for hydrogen, halogen, alkyl or a carboxy group, or two adjacent X's jointly represent the grouping:

in which case the other X's are hydrogen.

6. The process which comprises treating with a solution of a ferric salt an anthrahydroquinone-9.10-diestersulfonic salt of the formula:

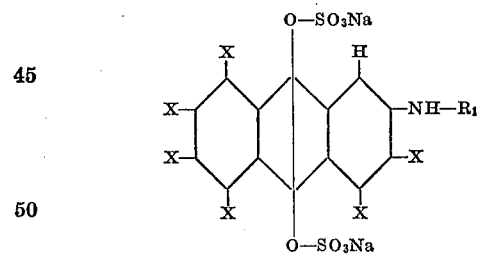

wherein $R_1$ stands for hydrogen or an alkyl group, and X for hydrogen, halogen, alkyl or a carboxy group, or two adjacent X's jointly represent the grouping:

in which case the other X's are hydrogen.

7. The process which comprises treating with a solution of a ferric salt having a weakly acid reaction an anthrahydroquinone-9.10-diestersulfonic salt of the formula:

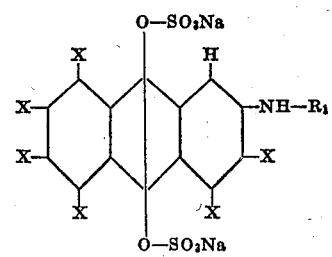

wherein $R_1$ stands for hydrogen or an alkyl group, and X for hydrogen, halogen, alkyl or a carboxy group, or two adjacent X's jointly represent the grouping:

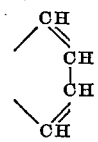

in which case the other X's are hydrogen.

8. The process which comprises treating with a solution of a ferric salt having a weakly acid reaction and in the presence of a neutral salt an anthrahydroquinone-9.10-diestersulfonic salt of the formula:

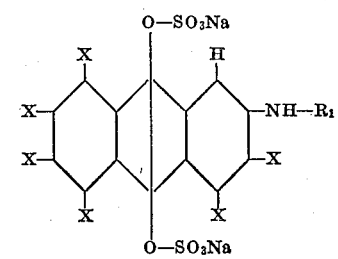

wherein $R_1$ stands for hydrogen or an alkyl group, and X for hydrogen, halogen, alkyl or a carboxy group, or two adjacent X's jointly represent the grouping:

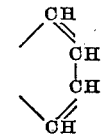

in which case the other X's are hydrogen.

9. The process which comprises treating with an acid oxidizing agent an anthrahydroquinone-9.10-diestersulfonic salt of the formula:

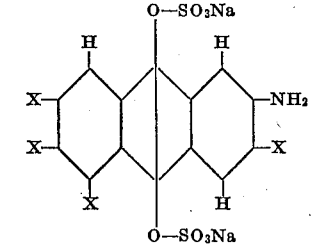

wherein X stands for hydrogen, halogen, methyl or a carboxy group, or the two X's in 5.6-position jointly represent the grouping:

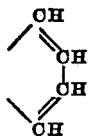

in which case the other X's are hydrogen.

10. The process which comprises treating with a solution of a ferric salt an anthrahydroquinone-9.10-diestersulfonic salt of the formula:

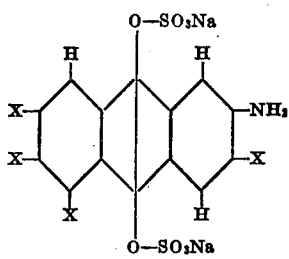

wherein X stands for hydrogen, halogen, methyl or a carboxy group, or the two X's in 5.6-position jointly represent the grouping:

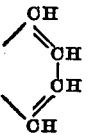

in which case the other X's are hydrogen.

11. The process which comprises treating with a solution of a ferric salt having a weakly acid reaction an anthrahydroquinone-9.10-diestersulfonic salt of the formula:

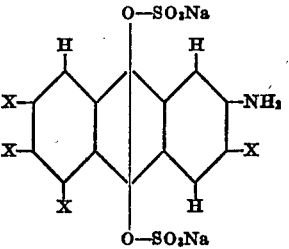

wherein X stands for hydrogen, halogen, methyl or a carboxy group, or the two X's in 5.6-position jointly represent the grouping:

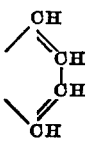

in which case the other X's are hydrogen.

12. The process which comprises treating with a solution of a ferric salt having a weakly acid reaction and in the presence of a neutral salt an anthrahydroquinone-9.10-diestersulfonic salt of the formula:

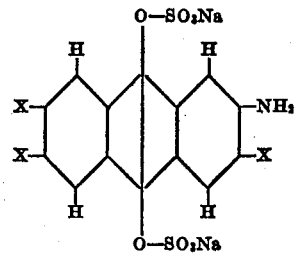

wherein X stands for hydrogen, halogen, methyl or a carboxy group, or the two X's in 5.6-position jointly represent the grouping:

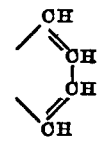

in which case the other X's are hydrogen.

13. The process which comprises treating with an acid oxidizing agent an anthrahydroquinone-9.10-diestersulfonic salt of the formula:

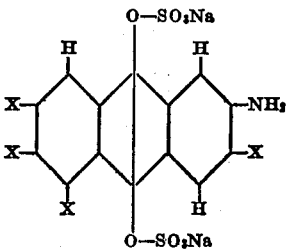

wherein X stands for hydrogen or halogen.

14. The process which comprises treating with a solution of a ferric salt an anthrahydroquinone-9.10-diestersulfonic salt of the formula:

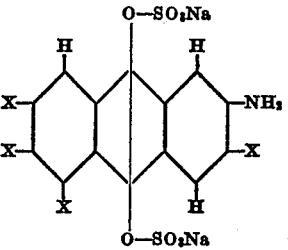

wherein X stands for hydrogen or halogen.

15. The process which comprises treating with a solution of a ferric salt having a weakly acid reaction an anthrahydroquinone-9.10-diestersulfonic salt of the formula:

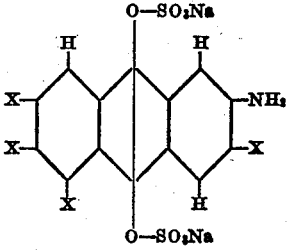

wherein X stands for hydrogen or halogen.

16. The process which comprises treating with a solution of a ferric salt having a weakly acid reaction and in the presence of a neutral salt an anthrahydroquinone-9.10-diestersulfonic salt of the formula:

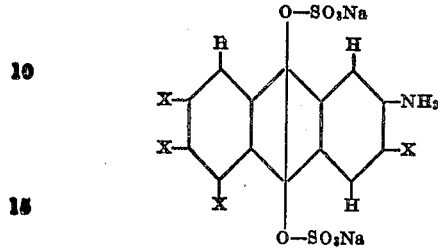

wherein X stands for hydrogen or halogen.

17. The process which comprises treating with an acid oxidizing agent the disodium salt of 2-amino-anthrahydroquinone-9.10-diestersulfonic acid of the formula:

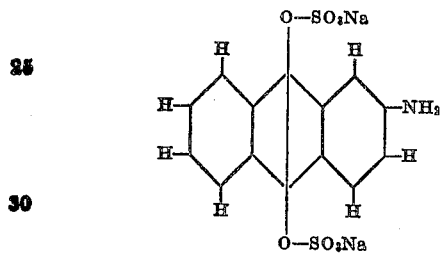

18. The process which comprises treating with a solution of a ferric salt the disodium salt of 2-amino-anthrahydroquinone-9.10-diestersulfonic acid of the formula:

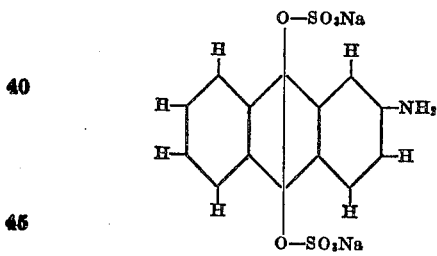

19. The process which comprises treating with a solution of a ferric salt having a weakly acid reaction the disodium salt of 2-amino-anthrahydroquinone - 9 . 10 - diester-sulfonic acid of the formula:

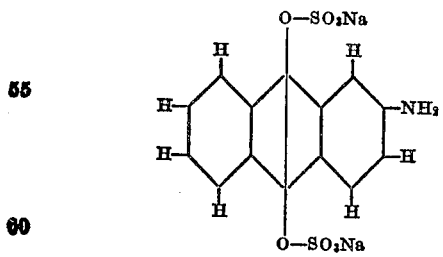

20. The process which comprises treating with a solution of a ferric salt having a weakly acid reaction and in the presence of a neutral salt the disodium salt of 2-amino-anthrahydroquinone-9.10-diestersulfonic acid of the formula:

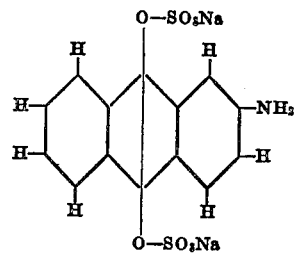

21. As a new product the N—N'-dihydro-5.6-5'.6'-dibenz-1.2.2'.1'-anthraquinone-azine of the probable formula:

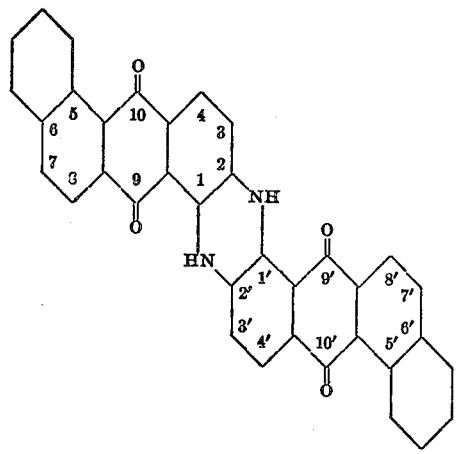

forming a green powder and dyeing cotton from a blue vat green tints.

In testimony whereof, we affix our signatures.

KARL SCHIRMACHER.
WILHELM SCHAICH.
ARTHUR WOLFRAM.
HANS TAMPKE.
KURT BILLIG.
WERNER SCHIRMACHER.